No. 728,853. PATENTED MAY 26, 1903.
W. S. BROWN.
ANIMAL POKE.
APPLICATION FILED JULY 20, 1900.
NO MODEL.

Witnesses:
G. F. Downing.
S. G. Nottingham.

Inventor:
W. S. Brown
By H. A. Seymour
Attorney.

THE NORRIS PETERS CO., PHOTO-LITHO., WASHINGTON, D. C.

No. 728,853.  
Patented May 26, 1903.

UNITED STATES PATENT OFFICE.

WILLIAM STEWART BROWN, OF WICHITA, KANSAS.

ANIMAL-POKE.

SPECIFICATION forming part of Letters Patent No. 728,853, dated May 26, 1903.

Application filed July 20, 1900. Serial No. 24,346. (No model.)

*To all whom it may concern:*

Be it known that I, WILLIAM STEWART BROWN, a citizen of the United States, residing at Wichita, in the county of Sedgwick and State of Kansas, have invented certain new and useful Improvements in Breachy-Animal Pokes, of which the following is a specification.

My invention relates to an improvement in animal-pokes. This class of inventions has heretofore been impractical. First, the animal was liable to hang itself in the wire; second, they were dangerous to the herd which said animal associates with.

My invention provides a poke that is simple, cheap, durable, and easy of construction. The construction thereof is such as to avoid becoming entangled in the fence-wire. If the animal wearing one of my improved pokes should make a frantic dash through a herd of stock, said poke could not lacerate or otherwise injure said stock. I attain these objects by the mechanism illustrated in the accompanying drawings, in which—

Figure 3:
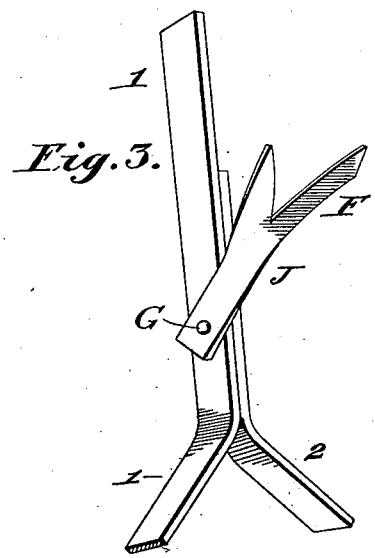
Figure 2:
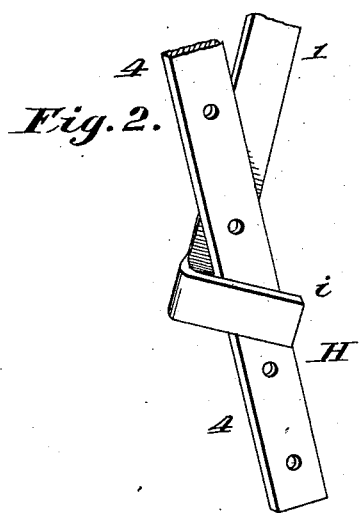
Figure 1:
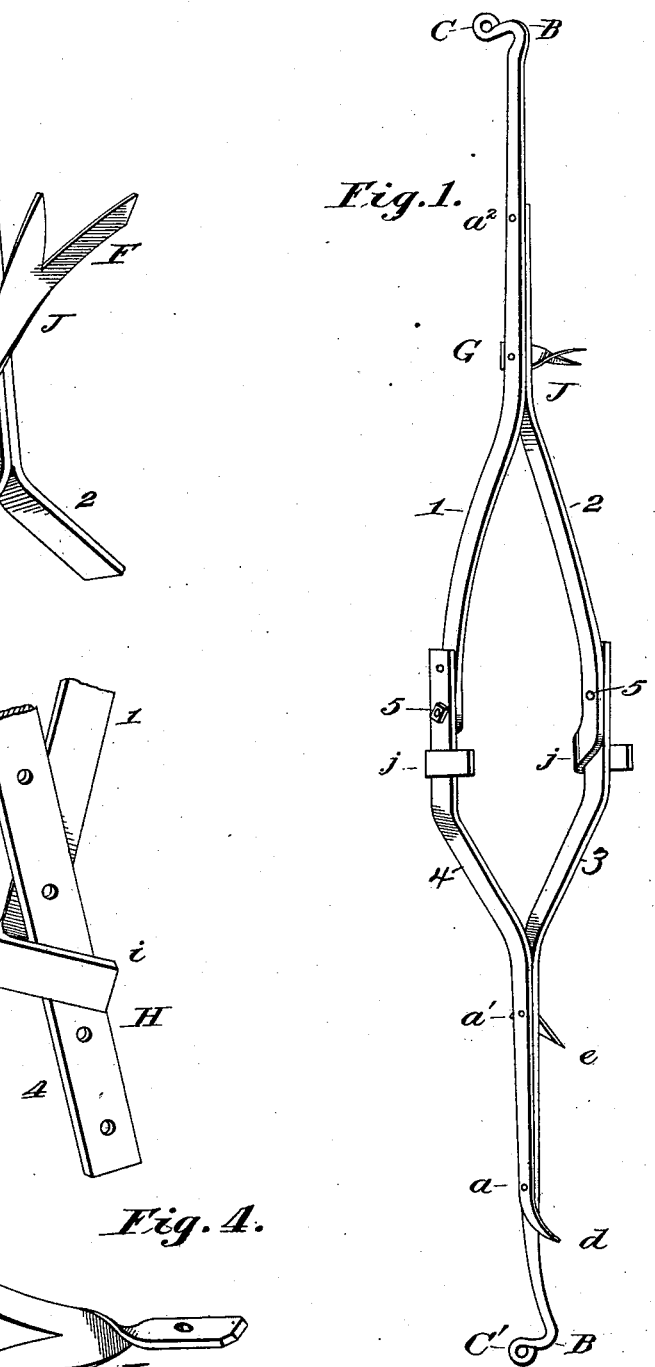
Figure 4:
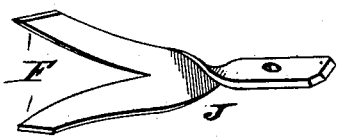

Figure 1 is a view in perspective of my poke. Fig. 2 is an enlarged detail view of the joint and hinge of said poke. Fig. 3 is also an enlarged sectional view with two-point barb attached thereto. Fig. 4 is a two-point barb detached.

Similar characters refer to similar parts throughout the several views.

My improved poke is constructed of four bars of flat steel, preferably about three-fourths of an inch wide, with barbs attached thereto. Said bars are numbered 1, 2, 3, and 4, respectively, and are riveted together at $a$ $a'$ $a^2$. Said bars are then bent so that when pivotally secured together with bolts 5 they form an ellipse. Bars 1 and 3 are provided with hooks B B', provided at their ends with eyelets which form safeguards for the ends of said hooks. The lower end of bar 4 terminates with a barb $d$ about an inch long, and a similar barb is attached to bars 3 and 4 with rivet $a'$.

Fig. 4 is a two-point barb, with points F spread about two inches apart, preferably made of flat iron and about three inches long, one end of said barb being given a twist and pivotally secured to bars 1 and 2 at right angles to said bars with rivet G, Fig. 1.

Referring to Fig. 3, it will be seen that if barb F, Fig. 4, should get hooked over a wire and the animal should pull back said barb should turn up and release said wire; otherwise serious results would follow. After releasing said wire said barb will then drop down to its normal position, and shoulder J will come in contact with bar 2 and prevent said barb from falling down and continually pricking the animal in the top of the neck.

Bars 3 and 4 are provided with a series of holes H, Fig. 2. Said holes are for the purpose of adjusting said poke to different-sized necks; but so many holes in said bars weakens them, thus making them easily bent. This is provided for by curving the ends of bars 1 and 2 around bars 3 and 4, as shown at $i$, Fig. 1, so as to pass across in front of bars 3 and 4, then pass back at right angles outside of said bars 3 and 4. Said curves prevent the top section of said poke from falling down over the animal's head while grazing and support bars 3 and 4 against any side pressure.

Now it will be seen that if an animal is provided with one of my improved pokes and the top section of said poke comes in contact with an obstruction said section will fold back and barb F will prick the animal in the neck. If the lower section of said poke encounters an obstruction, barbs $d$ and $e$ come in contact with the breasts. If said poke is forced against the fence at an angle of, say, forty-five degrees, the construction of joints shown, Fig. 3, is such that it will not be impaired, and one of said barbs F, Fig. 1, would prick the animal's neck, whereas if only one barb were used it would pass down the side of the neck and lose its desired effect.

Having thus described my invention, what I desire to secure by United States Letters Patent is—

1. An animal-poke comprising a yoke, a bar projecting upwardly therefrom, and a barb pivoted to said bar and provided with a shoulder to engage the same to limit the movement of said barb.

2. An animal-poke comprising a yoke, a bar projecting upwardly therefrom, a barb pivoted to said bar and having two fingers disposed at an angle to its body portion and a shoulder at the juncture of said fingers and body portion of the barb and adapted to engage said bar.

WILLIAM STEWART BROWN.

Witnesses:
C. S. CALDWELL,
GEO. T. JONES.